(12) United States Patent
Lin (10) Patent No.: US 10,902,722 B2
(45) Date of Patent: Jan. 26, 2021

(54) METHOD FOR PROVIDING INCIDENT SPECIFIC INFORMATION AT A VEHICLE COMPUTER

(71) Applicant: MOTOROLA SOLUTIONS, INC, Chicago, IL (US)

(72) Inventor: Lin Lin, Fox River Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 541 days.

(21) Appl. No.: 15/592,397

(22) Filed: May 11, 2017

(65) Prior Publication Data

US 2018/0330612 A1 Nov. 15, 2018

(51) Int. Cl.
| | |
|---|---|
| *G08G 1/123* | (2006.01) |
| *G08G 1/127* | (2006.01) |
| *G08B 27/00* | (2006.01) |
| *G06Q 50/26* | (2012.01) |
| *G06Q 10/10* | (2012.01) |
| *G08G 1/00* | (2006.01) |

(52) U.S. Cl.
CPC ............ *G08G 1/127* (2013.01); *G06Q 10/10* (2013.01); *G06Q 50/26* (2013.01); *G08B 27/001* (2013.01); *G08G 1/202* (2013.01)

(58) Field of Classification Search
CPC .......... G08G 1/27; G08G 1/127; G08G 1/202; G08B 27/001; G06Q 10/10; G06Q 50/26
USPC ........................................................ 340/989
See application file for complete search history.

(56) References Cited

U.S. PATENT DOCUMENTS

| | | | |
|---|---|---|---|
| 4,017,825 A | 4/1977 | Pichey | |
| 4,281,217 A | 7/1981 | Dolby | |
| 5,969,596 A | 10/1999 | Wu | |
| 6,204,844 B1 | 3/2001 | Fumarolo et al. | |

(Continued)

FOREIGN PATENT DOCUMENTS

WO  2011090565 A1  7/2011

OTHER PUBLICATIONS

Computer-aded dispatch, Wikipedia, https://en.wikipedia.org/wiki/Computer-aided_dispatch, downloaded from internet: Apr. 19, 2017, all pages.

(Continued)

*Primary Examiner* — Kerri L McNally
*Assistant Examiner* — Thang D Tran
(74) *Attorney, Agent, or Firm* — Raguraman Kumaresan (57) ABSTRACT

A method for providing incident specific information at a vehicle computer. In operation, the vehicle computer receives an incident assignment including information related to a current incident from a dispatch computer. The vehicle computer further receives an information request and in response, identifies a first context parameter by co-relating the information request with information related to the current incident and a second context parameter by co-relating the information request with information not related to the current incident. The vehicle computer generates a response to the information request based on the first context parameter when the current incident status identifies that the vehicle is responding to the current incident. Otherwise, the vehicle computer generates a response to the information request based on the second context parameter.

20 Claims, 3 Drawing Sheets

(56) References Cited

U.S. PATENT DOCUMENTS

| | | | |
|---|---|---|---|
| 6,940,422 B1* | 9/2005 | Bachelder | G08G 1/087 340/906 |
| 8,941,677 B1* | 1/2015 | Hallenbeck | G06T 11/00 345/502 |
| 8,947,203 B2 | 2/2015 | Kolar | |
| 9,135,808 B2 | 9/2015 | Johnson et al. | |
| 9,437,111 B2 | 9/2016 | Ignaczak et al. | |
| 2003/0062998 A1* | 4/2003 | Rubenstein | G06Q 10/10 340/539.2 |
| 2003/0163233 A1 | 8/2003 | Song et al. | |
| 2004/0257208 A1 | 12/2004 | Huang et al. | |
| 2005/0203998 A1* | 9/2005 | Kinnunen | G10L 25/78 709/204 |
| 2005/0245232 A1* | 11/2005 | Jakober | G08B 27/005 455/410 |
| 2006/0047543 A1* | 3/2006 | Moses | G06Q 50/265 705/325 |
| 2007/0040700 A1* | 2/2007 | Bachelder | G08G 1/0965 340/902 |
| 2009/0284348 A1* | 11/2009 | Pfeffer | G08B 25/006 340/7.3 |
| 2011/0071880 A1* | 3/2011 | Spector | H04W 4/90 340/573.1 |
| 2011/0117878 A1* | 5/2011 | Barash | H04W 4/90 455/404.2 |
| 2011/0181443 A1 | 7/2011 | Gutierrez et al. | |
| 2011/0281547 A1* | 11/2011 | Cordero | G08B 27/001 455/404.1 |
| 2013/0148751 A1* | 6/2013 | Kumhyr | H04W 4/08 375/259 |
| 2014/0057610 A1* | 2/2014 | Olincy | H04W 4/16 455/414.1 |
| 2014/0068700 A1* | 3/2014 | Reilly | H04L 63/20 726/1 |
| 2014/0070942 A1 | 3/2014 | Haase et al. | |
| 2014/0197920 A1 | 7/2014 | Bates | |
| 2014/0266689 A1* | 9/2014 | McKinley | G08B 21/0446 340/539.1 |
| 2014/0372015 A1 | 12/2014 | Namm | |
| 2015/0254968 A1 | 9/2015 | Sanders et al. | |
| 2015/0282061 A1* | 10/2015 | Matthews | H04W 4/22 455/404.2 |
| 2015/0289122 A1* | 10/2015 | Friesen | H04W 4/02 455/404.2 |
| 2016/0036899 A1* | 2/2016 | Moody | H04L 67/10 709/217 |
| 2016/0150366 A1* | 5/2016 | Miller | H04W 4/021 455/456.4 |
| 2016/0227382 A1* | 8/2016 | Sergeev | H04W 4/08 |
| 2016/0274770 A1 | 9/2016 | Lovati et al. | |
| 2016/0373473 A1* | 12/2016 | Truong | H04W 4/029 |
| 2017/0124505 A1* | 5/2017 | Nakfour | H04W 4/90 |

OTHER PUBLICATIONS

Geospatial Considerations for Emergency Call-Taking, Computer-Aided Dispatch, and recorded Management Systems, An Esri White Paper, 380 New York Street, Redlands, California 92373-8100 USA, Jan. 2016.

APCO ANS 1.110.1-2015, Multi-Functional Multi-Discipline Computer Aided Dispatch (CAD) Minimum Functional Requirements, APCO International Leaders in Public Safety communications, 351 N. Williamson Blvd., Daytona Beach, FL 32114 USA, all pages.

DHS Science and Technology Directorate, Next-Generation Incident Command System, https://www.dhs.gov/sites/default/files/publications/Next%20Generation%20Incident%20Command%20System-NICS_0.pdf, Homeland Security, Jun. 5, 2016, all pages.

Crimestar Corporation: "Mobile Digital Communicator Operations Manual", Sep. 9, 2008, pp. 1-84, Retrieved from the Internet: URL:http://crimestar.com/mdcusermanual.pdf [retrieved on Jun. 20, 2018], all pages.

The International Search Report and the Written Opinion corresponding patent application No. PCT/US2018/030477, filed May 1, 2018, all pages.

* cited by examiner

METHOD FOR PROVIDING INCIDENT SPECIFIC INFORMATION AT A VEHICLE COMPUTER

BACKGROUND OF THE INVENTION

In emergency situations, public safety personnel such as police officers, firefighters, paramedics, emergency medical assistants, service technicians, disaster relief workers, military rescue personnel, and like first responders, are typically dispatched by an operator to an incident scene to respond to remedy the emergency. Public safety personnel utilize and operate communication devices, both handheld and portable radios, while working in the field. Vehicles deployed for responding to emergency situations are often integrated with devices such as radios to communicate with the operator and other personnel in the field. Public safety personnel may have to manually operate the radio or their communication devices to obtain information related to the emergency situation. However, manual operation of devices often interferes with the focus of the public safety personnel as they attempt to interact with the devices while they are using the vehicle to perform their duties.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a method for providing incident specific information at a vehicle computer. The method comprises receiving an incident assignment including information related to a current incident from a dispatch computer, receiving an information request, identifying a first context parameter by co-relating the information request with information related to the current incident and a second context parameter by co-relating the information request with information not related to the current incident, determining a current incident status of a vehicle associated with the vehicle computer, generating a response to the information request based on the first context parameter when the current incident status identifies that the vehicle is responding to the current incident; and generating, a response to the information request based on the second context parameter when the current incident status identifies that the vehicle is not responding to the current incident.

Another exemplary embodiment provides a vehicle computer that includes a network interface configured to receive an incident assignment including information related to a current incident from a dispatch computer, an input interface configured to receive an information request, and an electronic processor communicatively coupled to the network interface and the input interface. The electronic processor is configured to identify a first context parameter by co-relating the information request with information related to the current incident and a second context parameter by co-relating the information request with information not related to the current incident, determine a current incident status of a vehicle associated with the vehicle computer, generate a response to the information request based on the first context parameter when the current incident status identifies that the vehicle is responding to the current incident, and generate a response to the information request based on the second context parameter when the current incident status identifies that the vehicle is not responding to the current incident.

For ease of description, some or all of the exemplary systems presented herein are illustrated with a single exemplar of each of its component parts. Some examples may not describe or illustrate all components of the systems. Other exemplary embodiments may include more or fewer of each of the illustrated components, may combine some components, or may include additional or alternative components.

Figure 1:
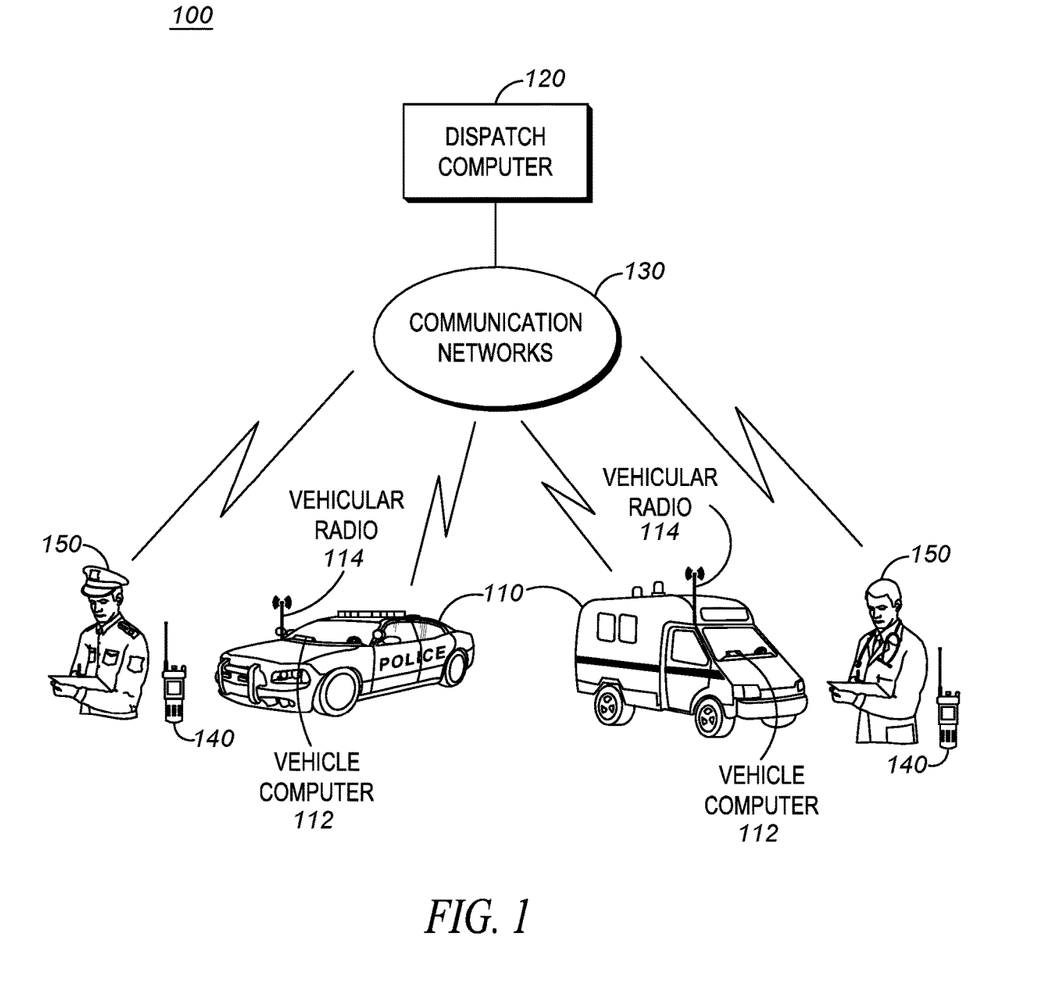
FIG. 1 is a block diagram of a communication system, in accordance with some embodiments.

FIG. 1 is a block diagram of one exemplary embodiment of a communication system 100. The communication system 100 includes one or more public safety vehicles 110 having a vehicle computer 112 that is configured to communicate with a dispatch computer 120 through one or more communication networks 130. Public safety vehicles 110 may comprise such vehicles as rescue vehicles, ladder trucks, ambulances, police cars, fire engines, and the like. Although only two public safety vehicles 110 are shown, one of ordinary skill in the art will recognize that any number of vehicles may be routed to a particular incident. The dispatch computer 120 may be deployed in a computer aided dispatch (CAD) center or a command center that is responsible for functions such as dispatch operations, monitoring incidents, providing instructions to personnel responding to the incident, and the like. An operator of the dispatch center or the command center may receive an emergency incident notification and a location of the emergency, for example, through a 911 emergency call. In response, the operator may manually, or via the dispatch computer 120, identify public safety vehicles 110 (or corresponding public safety responders 150) to be dispatched to the emergency location (also referred to as an incident scene) and sends notification of an incident assignment to the vehicle computer 112 of the respective public safety vehicles 110 via the communication networks 130. In some embodiments, the dispatch computer 120 also creates one or more talk groups or assigns one or more voice channels for the public safety vehicles 110 assigned to the incident to communicate with each other and the dispatch computer 120 during the incident.

The communication system 100 further includes one or more communication devices such as a vehicular radio 114 and a handheld communication device 140 that allow an occupant of the vehicle 110 to communicate with other communication devices via communication networks 130. In the public safety context, the term occupant may refer to persons such as public safety responders 150 who are authorized to use the vehicle 110 for responding to the assigned incident. Although, only one public safety responder 150 is shown corresponding to each vehicle 110 in FIG. 1, it is possible that each public safety vehicle 110 may be occupied or authorized for use by more than one public safety responder 150 or users at a given time. In one embodiment, the vehicular radio 114 is mounted at the public safety vehicle 110 to allow the occupant to use the radio 114 for communication when the occupant is inside the vehicle 110. In alternate embodiments, the vehicular radio 114 is designed to be portable and further detachable from the vehicle 110 to enable the occupant to use the radio 114 for communication when the occupant is outside the vehicle 110. In one embodiment, the vehicular radio 114 is configured as a two-way radio which utilizes a push-to-talk (PTT) switch for performing half-duplex communication on one or more communication channels assigned by the dispatch computer 120. The handheld communication device 140 may include a land mobile radio (LMR) that an occupant of the vehicle 110 may carry with him or her upon exiting the vehicle 110, and further allows the occupant to communicate with other communication devices when the occupant is not using the vehicular radio 114 or when the occupant is outside the vehicle 110. The handheld communication device 140 includes a land mobile radio, mobile telephone, tablet, smart watch or other smart wearable device, or other devices that are or can be configured to communicate over the communication networks 130.

The communication networks 130 may include a wired or wireless network, or a combination of wired and wireless networks, operated for example, by a cellular service provider, or any public safety network operated by a government or private organization. In one embodiment, the communication networks 130 may include one or more of land mobile radio (LMR) networks, such as implemented in accordance with association of public safety communication officials (APCO) Project 25 (P25) networks and long term evolution (LTE) networks. The communication networks 130, for example, may include network components such as base stations (not shown) that can receive information (data, voice, video, etc) in a signal from vehicle computer 112, vehicular radio 114, and handheld communication devices 140. The base stations can also transmit information in signals to vehicle computer 112, vehicular radio 114, and handheld communication device 140.

In accordance with embodiments, the vehicle computer 112 provides incident specific information to an occupant of the vehicle 110. In one embodiment, the vehicle computer 112 provides incident specific information at the public safety vehicle 110 in response to a user query originating from the public safety responder 150 of the vehicle 110. In alternate embodiments, the vehicle computer 112 provides incident specific information at the public safety vehicle 110 in response to a request received from the dispatch computer 120 or another remote device. While providing incident specific information to the public safety responder 150 at the public safety vehicle 110, the vehicle computer 112 provides information to the public safety responder 150 that is automatically determined based on a current incident status of the public safety vehicle 110 and context information derived from information related to the incident being responded to by the public safety vehicle 110. In accordance with embodiments, the current incident status of the public safety vehicle 110 indicates whether the public safety vehicle 110 is responding to a current incident or not. For example, the current incident corresponds to an incident for which an incident assignment notification is recently received at the vehicle computer 112.

Figure 2:
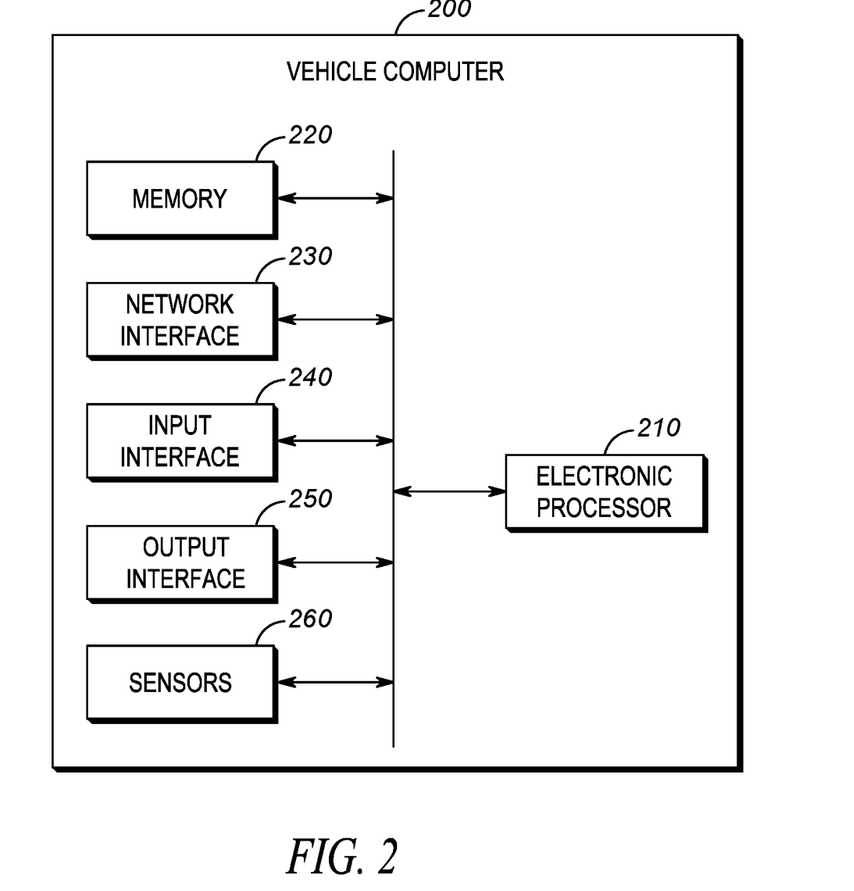
FIG. 2 is a block diagram of an apparatus implemented at a vehicle computer employed in the communication system of FIG. 1, in accordance with some embodiments.

FIG. 2 is a block diagram of an apparatus 200 in accordance with some embodiments. In accordance with embodiments, the apparatus 200 is implemented at the vehicle computer 112 included in the public safety vehicles 110 shown in FIG. 1 to provide incident specific information, for example, to occupants such as public safety responders 150 authorized to operate the vehicle 110. The functionality and components associated with the apparatus 200 may be implemented in a standalone computing device that is mounted in the public safety vehicle 110. In other embodiments, the apparatus 200 may be integrated within the body components of the vehicle 110. For example, the functionality and components associated with the apparatus 200 may be installed in different body components of the vehicle 110. In this example, each electronic component/hardware element associated with the apparatus 200 may be further interconnected with each other and other devices (such as vehicular radio 114) deployed at the vehicle 110 via wired or wireless interfaces. In one embodiment, some of the functionalities (and corresponding electronic components/hardware elements) of the apparatus 200 are implemented in the vehicular radio 114 provided at the public safety vehicle 110.

The apparatus 200 includes an electronic processor 210, for example, a microprocessor or another electronic device. The electronic processor 210 is electrically connected to a memory 220, a network interface 230, an input interface 240, an output interface 250, and sensors 260. In some embodiments, the apparatus 200 may include fewer or additional components in configurations different from that illustrated in FIG. 2. In some embodiments, the apparatus 200 performs additional functionality than the functionality described below.

The memory 220 includes read-only memory (ROM), random-access memory (RAM), other non-transitory computer-readable media, or a combination thereof. The electronic processor 210 is configured to receive non-transitory computer readable instructions and data from the memory 220 and execute, among other things, the instructions. In particular, the electronic processor 210 executes instructions stored in the memory 220 to perform the methods described herein as set forth in FIG. 3, for example. In accordance with some embodiments, the memory 220, in addition to storing the instructions needed for the electronic processor 210 to perform the methods described herein, may maintain and update one or more of: information related to a current incident which is obtained, for example, from the dispatch computer 120; information not related to the current incident such as one or more previous incidents, or incidents assigned to other public safety responders; information related to the current incident status and operation of the public safety vehicle 110; information related to occupants such as one or more public safety responders 150 authorized to operate the public safety vehicle 110; and the like. The information related to current incident includes at least one of an identifier of the current incident, location of the current incident, type and severity level of the current incident, and user profiles related to the current incident. In one embodiment, the user profile includes information about a list of users, for example, public safety responders assigned to the incident. The information in the user profile, for example, includes, but not limited to, name, contact information (e.g. phone number, talk group information, channel information, and the like), location, rank, role, experience, and skill level of the users related to the current incident. In one embodiment, the user profile also includes incident command system (ICS) information about a list of users assigned to an incident and corresponding command structure.

The network interface 230 sends and receives data to and from the communication networks 130. The network interface 230 may include a transceiver for wirelessly communicating with the dispatch computer 120 and one or more handheld communication devices 140 associated with a public safety responder 150. Alternatively, or in addition, the network interface 230 may include a connector or port for receiving a wired connection, such as an Ethernet cable. The electronic processor 210 may generate electrical signals and may communicate information relating to the electrical signals over the communication networks 130 through the network interface 230, such as for receipt by the dispatch computer 120, vehicle computer 112 associated with other public safety vehicles 110, and handheld communication devices 140 associated with other public safety responders 150. In one embodiment, the network interface 230 may include a transceiver with higher transmitter power and antenna gain than the handheld communication device 140 carried by the public safety responder 150. The handheld communication device 140 may be configured to establish a short range wireless connection with the vehicle computer 112 via the network interface 230 to exchange information and communicate with the dispatch computer 120 and devices of other responders, for example, when the handheld communication device 140 carried by public safety responder 150 is outside its communication range. The electronic processor 210 may output data received from the communication networks 130 through the network interface 230, through one or more output interfaces 250 such as a speaker or a display, or a combination thereof.

The input interface 240 includes one or more user interface components to receive input from, for example, an occupant of the public safety vehicle 110. The input may be provided via, for example, a keypad, microphone, soft keys or buttons, touch pad, touch screen displays, gestures or gesture based devices, and the like. In accordance with embodiments, an occupant of the vehicle 110 such as a public safety responder 150 can query the vehicle computer 112 via the input interface 240 to receive incident specific information via the output interface 250. The output interface 250 includes one or more user interface components that provide system output, for example, via an electronic display or a monitor, a speaker, vehicle dashboard, light emitting diode (LED) indicators, alarms, and other electronic output means capable of being perceived by the occupant of the vehicle 110.

The sensors 260 include one or more sensing components that are deployed in the public safety vehicle 110 and further configured to provide information related to one or more operating parameters. The electronic processor 210 uses the operating parameters to identify the context of the vehicle 110, context of the occupant of the vehicle 110, and the current incident status of the vehicle 110. The operating parameters include parameters related to the operation of the vehicle 110, occupant of the vehicle 110, or the vehicle environment. In accordance with embodiments, the sensors 260 may include one or more of a global positioning system (GPS) receiver, motion sensor, door sensor, pressure sensor, proximity sensor, touch sensor, environmental sensors (e.g. temperature sensor), video sensor, and the like. For example, the GPS receiver is used to determine a geographic location of the vehicle 110. The motion sensor may be used to detect whether a vehicle 110 is in motion or is stopped. If the vehicle 110 is in motion, the motion sensor may also indicate whether the public safety responder 150 and the associated handheld communication device 140 are in the vehicle 110. The door sensor detects whether a door is open. For example, an open door may indicate that the public safety responder 150 and associated handheld communication device 140 are about to exit the vehicle 110. The pressure sensor can be used to detect whether a public safety responder 150 is sitting in a car seat of the vehicle 110. The video sensor such as a camera is used to detect whether a public safety responder 150 is in a field of view, that is, inside or outside of the vehicle 110. Other types of sensors can also be deployed in the vehicle 110.

In accordance with embodiments, the electronic processor 210 obtains operating parameters from the sensors 260 and uses this information in addition to the current incident status of the vehicle 110 to generate a response to an information request originating from the corresponding public safety responder 150 or a device (e.g. dispatch computer 120 or handheld communication device 140). In some embodiments, the response to the information request includes providing a status update or adjusting the operating condition of the vehicle 110. For example, the operating conditions include adjusting the speed of the vehicle 110, switching on/off the siren, or switching on/off the indicators (e.g. brake-lights, headlights, interior lights, dashboards etc.). For example, when the incident assignment requires a covert operation to be performed by the public safety responder 150, the electronic processor 210 may automatically switch off the siren and other light indicators when the vehicle 110 is approaching the location of the incident scene. In another embodiment, the electronic processor 210 may also obtain operating parameters of the vehicle 110 from the sensors 260 and provides a status update indicative of the current operation condition of the vehicle 110. For example, the electronic processor 210 may issue an alert or notification when it is determined in response to an incident assignment that the fuel level in the vehicle 110 is not adequate to travel to the location of the incident. In such cases, the electronic processor 210 may cause the output interface 250 to display a navigation map identifying locations of one or more nearest fuel stations.

Figure 3:
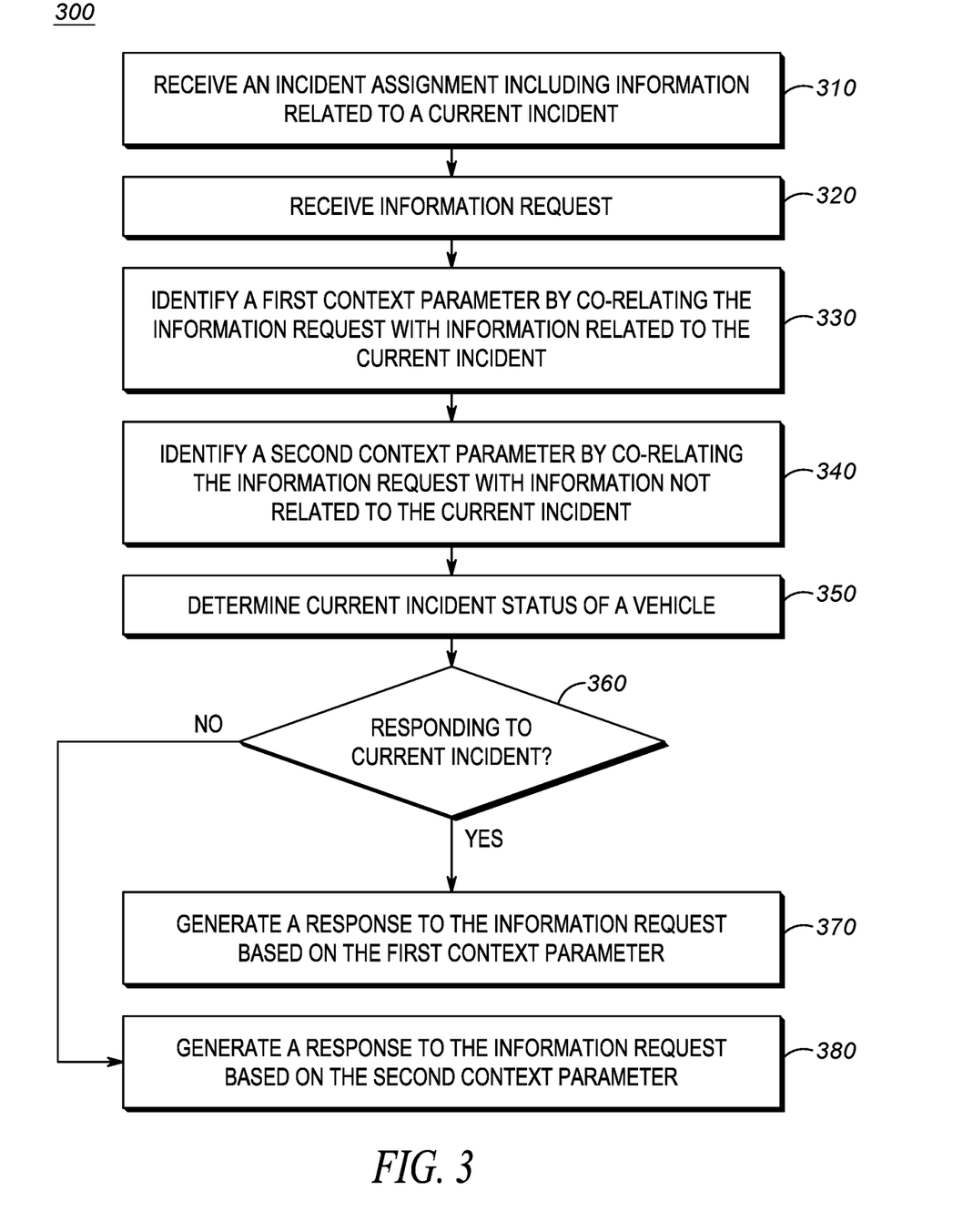
FIG. 3 is a flowchart of a method for operating a vehicle computer employed in the communication system of FIG. 1 to obtain incident specific information, in accordance with some embodiments.

FIG. 3 is a flowchart of an exemplary method 300 of operating a vehicle computer 112 to provide incident specific information to an occupant of the public safety vehicle 110. As an example, the method 300 is performed by one or more components of the apparatus 200 described in FIG. 2. Other embodiments of the method 300 may be performed on multiple components within the same device or on multiple devices.

At block 310, the public safety vehicle 110, at a network interface 230 of the vehicle computer 112, receives an incident assignment from the dispatch computer 120. In one embodiment, the dispatch computer 120 identifies one or more public safety vehicles 110 and/or corresponding public safety responders 150 in response to receiving an emergency notification identifying the incident and location of the incident. For example, the dispatch computer 120 identifies the public safety vehicles 110 located near the incident scene and updates its incident database with the incident assignment corresponding to the identified vehicles 110. The dispatch computer 120 may also use information such as the type and severity level of the incident, user profile (e.g. rank, role, experience, skill level, and the like) of the corresponding public safety responder 150 for incident assignment. In another example, the dispatch computer 120 assigns the incident to one or public safety responders 150 (for example, via the corresponding handheld communication devices 140), identifies the vehicles 110 corresponding to the assigned public safety responders 150, and sends a separate assignment notification including information related to the incident to the identified vehicles 110 via the vehicle computer 112. In accordance with some embodiments, the incident assignment further includes particular information related to the incident, for example, an identifier of the current incident, a location of the current incident, a type and severity level of the current incident, and one or more user profiles related to the current incident. In one embodiment, the incident assignment may include only a subset of the incident information, for example only an identifier of the incident. In this case, the vehicle computer 112, after receiving the incident assignment may send a separate request to the dispatch computer 120 or one or more other public safety servers to obtain additional information related to the incident based on the identifier of the incident. In accordance with some embodiments, the incident information is further locally stored at the memory 220 of the vehicle computer 112.

Next, at block 320, the public safety vehicle 110, receives an information request via an input interface 240 of the vehicle computer 112. In one embodiment, the information request corresponds to a user query received from an occupant such as a public safety responder 150 authorized to operate the public safety vehicle 110. For example, when the occupant speaks at a microphone of the vehicle computer 112, an audio signal corresponding to the speech is received at the input interface 240 and further the audio signal is processed to extract the information request. In one embodiment, the information request is extracted from the audio signal by the electronic processor 210 based on natural language processing (NLP) mechanisms that process the audio signal to extract the context (e.g. keywords) of the query. In one embodiment, the electronic processor 210 also identifies the source of the audio signal (i.e. identity of the occupant) based on one or more characteristics of the audio signal or by some other mechanisms such as face recognition. For example, the electronic processor 210 compares the voice characteristics of the audio signal with one or more voice profiles (corresponding to occupants registered to operate the vehicle 110) already stored in the memory 220 to identify the source of the audio signal. In this example, the electronic processor 210 may further use the identity of the source of the audio signal to identify the context of the query. In another example, the information request may be received via another device, such as the vehicular radio 114 deployed at the vehicle 110. In this embodiment, the public safety responder 150 may provide his query either via speech or text entry or via graphical user interface (GUI) components at the vehicular radio 114.

Next at block 330, the electronic processor 210 identifies a first context parameter by co-relating the information request with information related to the current incident. In accordance with some embodiments, the first context parameter is identified based at least on one of an identifier of the current incident, a location of the current incident, a type and severity level of the current incident, one or more user profiles related to the current incident, an operating conditions of the vehicle 110, a location of the vehicle 110, and an information related to a public safety responder 150 associated with the vehicle 110. Further, at block 340, the electronic processor 210 identifies a second context parameter by co-relating the information request with information not related to the current incident. In accordance with some embodiments, information not related to the current incident includes information related to at least on one or more previous incidents or incident assignments as well as non-incident information. The non-incident information may include information related to one or more user profiles not involved in the current incident, for example, contact information (such as phone numbers already available in a phone book stored at the memory 220) and location information associated with persons not involved in the current incident, such as personal contacts and others officers associated with other governmental or non-governmental agencies.

Next, at block 350, the electronic processor 210 of the vehicle computer 112 determines a current incident status of the public safety vehicle 110. In one embodiment, the current incident status of the public safety vehicle 110 is determined based on the location data of the vehicle 110. For example, if the location data indicates that the vehicle 110 is en-route to a location of the current incident, then the electronic processor 210 determines that the current incident status of the vehicle 110 indicates that the vehicle 110 is responding to the current incident corresponding to the received incident assignment. In one embodiment, the current incident status of the public safety vehicle 110 is also determined based on whether the public safety responder 150 corresponding to the vehicle 110 at which the incident assignment is received has accepted the incident assignment. In this case, the electronic processor 210 determines that the current incident status indicates that the vehicle 110 is responding to the current incident when a signal indicating acceptance of the incident assignment is received at the input interface 240. The acceptance signal may be received based on user input received from the public safety responder 150 via voice input, touch input, or text input methods. In alternate embodiments, the electronic processor 210 may also use information received from sensors 260 to determine whether the vehicle 110 is responding to the current incident based on vehicle context parameters such as the operating condition of the vehicle 110. For example, the electronic processor 210 may receive an indication from the sensors 260 that one or more vehicle components (such as siren) have been activated by the public safety responder 150 in response to the received incident assignment. In response to this indication, the electronic processor 210 may use a pre-stored condition to determine that the activation of one or more vehicle components by the public safety responder 150 (for example, after receiving the incident assignment) indicates that the public safety responder 150 has accepted the received incident assignment. In accordance with some embodiments, the electronic processor 210 also updates the current incident status at the memory 220 to identify that the vehicle 110 is responding to the current incident.

Next at block 360, the electronic processor 210 determines whether the vehicle is responding to a current incident based on the current incident status determined at block 350. When the current incident status identifies that the vehicle 110 is responding to the current incident, the vehicle computer 112 generates a response based on the first context parameter at block 370. Otherwise, when the current incident status identifies that the vehicle 110 is not responding to the current incident, the electronic processor 210 generates a response based on the second context parameter at block 380. In other words, the electronic processor 210 generates a response that is customized based on whether the vehicle 110 is determined to be responding to the current incident (corresponding to the incident assignment) or not. In accordance with some embodiments, the response is provided via one or more output interfaces 250 such as in visual, audible, or haptic forms. Some examples of responses that may be generated at the vehicle computer 112 are described below.

In one example, when the information request is identified as a request to contact a user, the electronic processor 210 identifies the user to be contacted based on whether the vehicle 110 is responding to the current incident or not. Assume that the information request corresponds to a user query "please connect me to the commander." In this case, the electronic processor 210 based on natural language processing techniques identifies at block 320 that the user of the vehicle 110 intends to call the commander. It is possible that the incident commander may vary for different incidents and also may vary based on whether the user is currently responding to the incident or not. Accordingly, the electronic processor at block 330 identifies a first context parameter by co-relating the information request with information related to the current incident. In this case, the first context parameter may represent contact information of a commander associated with the received incident assignment. The electronic processor 210 may obtain the contact information of the commander associated with the current incident during the incident assignment or may send a separate request to the dispatch computer 120 in response to the information request to obtain the contact information of the commander associated with the current incident. Further, when the current incident status at the memory 220 identifies that the vehicle 110 is responding to the current incident, the electronic processor 210 generates a response based on the first context parameter i.e. contact information of the commander. In this case, the electronic processor 210 may configure the vehicular radio 114 to initiate a communication with the commander based on the contact information of the commander. For example, the electronic processor 210 may directly dial the contact information of the commander extracted from the first contact parameter or set the vehicular radio 114 to a corresponding talk group or voice channel, so that the public safety responder 150 can readily talk to the commander of the current incident. Alternatively, the electronic processor 210 may also be configured to display the contact information of the commander associated with the current incident in response to the request. In response, the public safety responder 150 may choose to manually select the displayed contact information to talk to or message the commander.

In the above example, the electronic processor also identifies a second context parameter by co-relating the information request with information not related to the current incident. For example, in this case, the electronic processor 210 may extract the contact information of a commander profile (which may be different from the commander profile associated with the first context parameter) stored, for example, in the phone book of the vehicle computer 112 or the handheld communication device 140. In other words, the second context parameter may represent contact information of a different commander, for example, a commander associated with one or more previous incidents or based on a default relationship to the public safety responder 150 or based on an assignment to officers on other non-incident related operations. It is also possible that the second context parameter may represent contact information corresponding to a plurality of user profiles that match the commander profile. In this case, the electronic processor 210 selects contact information corresponding to the commander profile from the second context parameter further based on the vehicle context. For example, after determining that the vehicle 110 is not responding to the current incident corresponding to the received incident assignment, the electronic processor 210 may select a commander profile corresponding to a commander who is relatively located closer to the current location of the vehicle 110. Accordingly, when the electronic processor 210 determines that the current incident identifies that the vehicle 110 is not responding to the current incident, the electronic processor 210 generates a response based on the second context parameter i.e. contact information of the selected commander profile. In this case, the electronic processor 210 may configure a vehicular radio 114 at the vehicle 110 to initiate a communication (or dial the contact information) with the selected commander profile. Alternatively, the electronic processor 210 may also be configured to display the contact information of the selected commander profile. In response, the public safety responder 150 may choose to manually select the displayed contact information to talk to or message the commander.

In a further example, the information request may be identified as a request to join a talk group. The electronic processor 210 identifies the talk group to be affiliated based on whether the vehicle 110 is responding to the current incident or not. In this example, the request to join a talk group may be received via query from the public safety responder 150 corresponding to the vehicle 110 or may be automatically triggered based on a signal received at the network interface 230 from either a dispatch computer 120 or other public safety servers. In response, the electronic processor 210 identifies a first context parameter that represents talk group information related to the current incident corresponding to the incident assignment. The electronic processor 210 obtains the talk group information from the incident assignment or sends a separate request to obtain the talk group information related to the current incident from the dispatch computer 120. Similarly, the electronic processor 210 also identifies a second context parameter that represents information related to talk groups that are previously assigned to the public safety responder 150, or are currently or were previously assigned to other public safety responders in the same agency as the public safety responder 150, or otherwise related to a previous incident that the vehicle 110 was responding prior to receiving the current incident assignment. The electronic processor 210 sends a request to the dispatch computer 120 or another public safety server to obtain talk group information associated with the second context information. If the current incident status of the vehicle 110 identifies that the vehicle 110 is responding to the current incident, then the electronic processor 210 configures the vehicular radio 114 to automatically join or affiliate to one or more talk groups related to the current incident based on the obtained talk group information associated with the first context parameter. Alternatively, if the current incident status of the vehicle 110 identifies that the vehicle 110 is not responding to the current incident, the electronic processor 210 configures the vehicular radio to automatically join one or more talk groups corresponding to the second context parameter that is not related to the current incident. In one embodiment, the electronic processor 210 may select the talk groups associated with the second context parameter further based on the vehicle context, for example, based on the incident status of one or more previous incidents assigned to the vehicle 110, current location of the vehicle 110 relative to the location of the one or more previous incidents, and the like.

In another example, when the information request is identified as a request to check a status of one or more users, the electronic processor 210 identifies the users corresponding to the status check based on whether the vehicle 110 is responding to the current incident or not. In accordance with embodiments, the status check may be related to providing or monitoring a location status, health status, established time of arrival (ETA) and other status information (e.g. video stream) related to identified users. Assume that the information request corresponds to a query "check location status for Officer John." In this case, the electronic processor 210 based on natural language processing techniques identifies at block 320 that the occupant of the vehicle 110 intends to check the current location of a particular user. It is possible that there may be many users with similar names. Accordingly, the electronic processor 210 at block 330 identifies a first context parameter by co-relating the information request with information related to the current incident. In this case, the first context parameter may represent data (such as location, contact information, video stream etc.) related to one or more officers named 'John' that are associated with the current incident. When the current incident status identifies that the vehicle 110 is responding to the current incident, the electronic processor 210 generates a response based on the first context parameter, i.e., provide location information of the officer named 'John'. In case there are multiple user profiles having same name as 'John', the electronic processor 210 may analyze additional information associated with each of the matching user profiles (and current incident status of vehicle 110) to select a particular user profile named 'John' for generating the response. In this case, the electronic processor 210 in addition to checking the incident status of the vehicle 110, further checks the vehicle context (such as operating conditions of the vehicle 110) as well as the relationship of the matching user profiles to the query source (i.e. public safety responder 150 of the corresponding vehicle 110) to select one of the user profiles and provide location status corresponding to the selected user profiles. Alternatively, the electronic processor 210 may provide a list of all matching user profiles to the public safety responder 150 via the output interface 250 and generates a response based on a selection of the user profiles by the public safety responder 150. In accordance with some embodiments, the electronic processor 210 may also provide additional information (such as health status, contact information, etc) related to the selected user profile. In one embodiment, the electronic processor 210 may be configured to display, via the output interface 250, one or more navigation routes (via a map application) to the location of the selected user profile.

Alternatively, in this example, when the current incident status identifies that the vehicle 110 is not responding to the current incident, the electronic processor 210 may identify the second context information by extracting user profile of officers named 'John' that is stored, for example, in the phone book of the vehicle computer 112 or another device. In other words, the second context parameter may represent contact information of a different officer named John who is not associated with the incident corresponding to the received incident assignment. For example, the electronic processor 210 may identify officers named 'John' from the same agency as the public safety responder 150 or from personal contact information stored in the phone book of the public safety responder 150. It is also possible that the second context parameter may represent a plurality of user profiles that match the name of the officer identified from the query. In this case, the electronic processor 210 selects a user profile from the second context parameter further based on the vehicle context. For example, after determining that the vehicle 110 is not responding to the current incident corresponding to the received incident assignment, the electronic processor 210 may select a user profile corresponding to a user who is relatively located closer to the current location of the vehicle 110 or alternatively based on a most recently contacted matching profile. Accordingly, when the electronic processor 210 determines that the current incident status identifies that the vehicle 110 is not responding to the current incident, the electronic processor 210 causes display of the location status of the selected user profile at the output interface 250.

In another example, the information request may include a request for navigation corresponding to a user query such as "bring up maps" or "find me a route" that does not specify a destination. In response, the electronic processor 210 generates a navigation route corresponding to a target destination automatically based on whether the vehicle 110 is responding to the current incident or not. For example, the electronic processor 210 may identify a first context parameter that represents a navigation route obtained based on the location of the incident corresponding to the incident assignment. The electronic processor may generate a second context parameter that represents a navigation route obtained based on the location of a previous incident which the vehicle 110 was responding prior to receiving the incident assignment for the current incident. Alternatively, the navigation route may be generated for a default location, for example, a location where the vehicle 110 is authorized to be parked when it is not responding to any incident. Accordingly, when the vehicle 110 is responding to the incident corresponding to the incident assignment, the electronic processor 210 provides a navigation route corresponding to the first context parameter. Otherwise, the electronic processor 210 provides a navigation route corresponding to the second context parameter. In one embodiment, the vehicle computer 112 also displays a map that identifies the location of other public safety vehicles 110 and corresponding public safety responders 150 depending on current incident status of the vehicle 110.

In another example, the information may include a request to adjust an operating condition of the vehicle 110. In response, the electronic processor 210 adjusts the operating condition of the vehicle 110 based on parameters that depend on whether the vehicle 110 is responding to the current incident or not. In accordance with some embodiments, the request to adjust an operating condition of the vehicle 110 may originate either from an occupant of the vehicle 110 or is automatically triggered based on a signal received from the dispatch computer 120 or other devices. The electronic processor 210 identifies a first context parameter, for example, corresponding to operating modes of one or more vehicle components. For example, incident assignment received at the vehicle computer 112 may indicate that the current incident is a covert operation that requires changing the operating modes of one or more vehicle components. For example, the first context parameter may indicate that vehicle components such as siren, dashboard camera, and headlights are to be turned off during the covert operation. In some embodiments, the electronic processor 210 may automatically determine the first context parameter identifying the adjustment required in the operating condition of the vehicle 110 by comparing the information related to the current incident with a first assigned policy (stored at the memory 220 or at a remote server) that maps operating conditions required for different incident parameters. The electronic processor 210 also identifies a second context parameter which is based on a previous incident or a default operating condition of the vehicle 110. For example, the second context parameters are identified based on a default operating condition of the vehicle 110 that may require that the dashboard camera and headlight remain turned on and siren to be turned off. In some embodiments, the electronic processor 210 may automatically determine the second context parameter identifying the adjustment required in the operating condition of the vehicle 110 based on a second assigned policy (stored at the memory 220 or at a remote server) that maps, for example, the operating conditions requirements for the vehicle 110 when the vehicle 110 is not involved in an incident.

If is determined that the vehicle 110 is responding to the current incident corresponding to incident assignment, the electronic processor 210 may generate a response based on the first context parameter which requires that the vehicle components such as siren, dashboard camera, and headlights are to be turned off during covert operation. Alternatively, if is determined that the vehicle 110 is not responding to the current incident, the electronic processor 210 may adjust the operating condition of the vehicle 110 based on the second context parameter which requires that the vehicle components such as dashboard and headlight to be turned on and siren to be turned off as a default operating condition. In one embodiment, the operating conditions requirements for the vehicle 110 may vary for different incidents and the vehicle computer 112 may obtain this information from the incident assignment received from the dispatch computer 120 or may send a separate request to obtain this information (for example, based on the first assigned policy) in response to incident assignment. Similarly, the vehicle 110 may be configured to automatically use the default operating condition (for example, based on the second assigned policy) when the vehicle 110 is not responding to any particular incident. In one embodiment, the electronic processor 210 also provides alerts and notification to the public safety responder 150 of the corresponding vehicle 110 and the dispatch computer 120 about the operating conditions of the vehicle 110. For example, the electronic processor 210 issues a notification to the public safety responder 150 when the operating conditions of the vehicle 110 have been updated or changed in accordance with the current incident status of the vehicle 110 or when the user has manually changed the operating condition of the vehicle 110. In some embodiments, the electronic processor 210 also issues an alert when one or more operating parameters of the vehicle 110 do not meet the requirements of the current incident or default operation. For example, the electronic processor 210 may issue an alert to the dispatch computer 120 when it determines that there will be a delay in reaching the incident scene or when the fuel level of the vehicle 110 is not adequate to travel to the location of the incident.

In accordance with some embodiments, the electronic processor 210 of the vehicle computer 112 is also configured to automatically create a workflow for the public safety responder 150 based on a current incident status of the vehicle. In these embodiments, the vehicle computer 112 automatically presents, via the output interface 250 such as the display, a workflow identifying events, functions, or tasks that require the attention of the public safety responder 150. In some embodiments, the workflow also specifies a sequence or order or time period associated with completing each event, function, or task. When the vehicle computer 112 determines that the vehicle 110 is responding to the current incident, the vehicle computer 112 creates an incident workflow for the public safety responder 150 by comparing information related to the current incident with a predetermined incident workflow policy (stored at the memory 220 or another remote server). The predetermined incident workflow policy includes incident related tasks that require the public safety responder 150, for example, to survey the incident scene, secure the border, interview the witness, collect the evidences, or draft reports, In accordance with some embodiments, the vehicle computer 112 customizes the workflow based on the specifics of the incident, and the current context of the vehicle 110 and the corresponding public safety responder 150. Alternatively, when the vehicle computer 112 determines that the vehicle 110 is not responding to the current incident, the vehicle computer 112 creates a non-incident workflow for the first responder by comparing information not related to the current incident with predetermined non-incident workflow policy (stored at the memory 220 or another remote server). For example, the predetermined non-incident workflow policy may require that the public safety responder 150 is provided with non-incident tasks such as patrolling an area, speed monitoring, or returning the vehicle 110 to a source location.

In accordance with embodiments of the disclosure, the system and methods described herein can be advantageously employed to provide incident specific information to public safety responders at a vehicle computer. Embodiments of the disclosure also allow the public safety responders to obtain incident specific information without having to manually operate their vehicular radio or communication device. In addition, the methods described herein automatically prepare a public safety vehicle in response to the incident assignment. The incident workflow created for the public safety vehicle in response to the incident assignment improves the incident response time and officer safety.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for providing incident specific information at a vehicle computer, the method comprising:
receiving, at a network interface of the vehicle computer, an incident assignment including information related to a current incident from a dispatch computer;
receiving, at an input interface of the vehicle computer, a query from an occupant of a vehicle associated with the vehicle computer;
identifying, at an electronic processor of the vehicle computer, a first context parameter by co-relating the query with information related to the current incident and a second context parameter by co-relating the query with information not related to the current incident;
determining, at the electronic processor, in response to receiving the query, whether a current incident status of the vehicle identifies that the vehicle is responding to the current incident or not responding to the current incident;
generating, at the electronic processor, a response to the query based on the first context parameter when the current incident status identifies that the vehicle is responding to the current incident; and
generating, at the electronic processor, a response to the query based on the second context parameter when the current incident status identifies that the vehicle is not responding to the current incident.

2. The method of claim 1, further comprising:
receiving, at the input interface, a signal indicating acceptance of the incident assignment; and
updating, at a memory, the current incident status to identify that the vehicle is responding to the current incident in response to receiving the signal.

3. The method of claim 1, further comprising:
determining, at the electronic processor, a location of the vehicle; and
updating, at a memory, the current incident status to identify that the vehicle is responding to the current incident when the location of the vehicle indicates that the vehicle is en-route to a location of the current incident.

4. The method of claim 1, wherein the information related to the current incident includes at least one of an identifier of the current incident, location of the current incident, type and severity level of the current incident, and user profiles related to the current incident.

5. The method of claim 1, wherein the first context parameter is identified based at least on one of an identifier of the current incident, location of the current incident, type and severity level of the current incident, user profiles related to the current incident, operating conditions of the vehicle, location of the vehicle, and information related to a user associated with the vehicle.

6. The method of claim 1, wherein the query includes a request to contact another user and further wherein generating the response further comprises:
when the current incident status of the vehicle identifies that the vehicle is responding to the current incident,
obtaining, based on the first context parameter, contact information of a first user profile related to the current incident that matches with the request, and
configuring a radio associated with the vehicle to initiate a communication based on the contact information of the first user profile; and
when the current incident status of the vehicle identifies that the vehicle is not responding to the current incident,
obtaining, based on the second context parameter, contact information of a second user profile that is not related to the current incident and further matches with the request, and configuring the radio to initiate a communication based on the contact information of the second user profile.

7. The method of claim 1, wherein the query includes a request to join a talk group and further wherein generating the response comprises:

when the current incident status of the vehicle identifies that the vehicle is responding to the current incident, obtaining, based on the first context parameter, first talk group information related to the current incident, and configuring a radio associated with the vehicle to join one or more talk groups of the current incident based on the first talk group information; and when the current incident status of the vehicle identifies that the vehicle is not responding to the current incident, obtaining, based on the second context parameter, second talk group information that is not related to the current incident, and configuring the radio to join one or more talk groups based on the second talk group information.

8. The method of claim 1, wherein the query includes a request to check status of one or more users and further wherein generating the response further comprises:

when the current incident status of the vehicle identifies that the vehicle is responding to the current incident, obtaining, based on the first context parameter, status of one or more first user profiles related to the current incident; and providing, at an output interface of the vehicle computer, notification identifying the status of the one or more first user profiles; and when the current incident status of the vehicle identifies that the vehicle is not responding to the current incident, obtaining, based on the second context parameter, status of one or more second user profiles that are not related to the current incident; and providing, at the output interface, notification identifying the status of the one or more second user profiles.

9. The method of claim 1, wherein the query includes a request for navigation and further wherein generating the response based on the first context parameter further comprises:

when the current incident status of the vehicle identifies that the vehicle is responding to the current incident, obtaining, based on the first context parameter, a first location that is related to the current incident, and providing, at an output interface of the vehicle computer, information identifying one or more routes to the first location of the current incident; and when the current incident status of the vehicle identifies that the vehicle is not responding to the current incident;

obtaining, based on the second context parameter, a second location that is not related to the current incident; and providing, at the output interface, information identifying one or more routes to the second location.

10. The method of claim 1, wherein the query includes a request to adjust an operating condition of the vehicle and further wherein generating the response further comprises:

when the current incident status of the vehicle identifies that the vehicle is responding to the current incident, obtaining, based on the first context parameter, a first set of one or more operating parameters for the vehicle that is mapped to the current incident, and adjusting the operating condition of the vehicle based on the obtained first set of one or more operating parameters; and when the current incident status of the vehicle identifies that the vehicle is not responding to the current incident, obtaining, based on the second context parameter, a second set of one or more operating parameters for the vehicle that is not mapped to the current incident; and adjusting the operating condition of the vehicle based on the second set of one or more operating parameters.

11. The method of claim 1, wherein the query is received via an audio signal, the method further comprising:

processing the audio signal to extract one or more keywords;

identifying the first context parameter by comparing the extracted keywords with information related to the current incident; and identifying the second context parameter by comparing the extracted keywords with information not related to the current incident.

12. A vehicle computer, comprising a network interface configured to receive an incident assignment including information related to a current incident from a dispatch computer;

an input interface configured to receive a query from an occupant of a vehicle associated with the vehicle computer; and an electronic processor communicatively coupled to the network interface and the input interface, wherein the electronic processor is configured to identify a first context parameter by co-relating the query with information related to the current incident and a second context parameter by co-relating the query with information not related to the current incident, determine, in response to receiving the query from the occupant of the vehicle, whether a current incident status of the vehicle identifies that the vehicle is responding to the current incident or not responding to the current incident, generate a response to the query based on the first context parameter when the current incident status identifies that the vehicle is responding to the current incident, and generate a response to the query based on the second context parameter when the current incident status identifies that the vehicle is not responding to the current incident.

13. The vehicle computer of claim 12, further comprising:

a memory configured to store non-transitory computer readable instructions including the current incident status, wherein the electronic processor updates the current incident status at the memory to identify that the vehicle is responding to the current incident when a signal indicating acceptance of the incident assignment is received at the input interface.

14. The vehicle computer of claim 13, wherein the electronic processor determines a location of the vehicle and updates the current incident status at the memory to identify that the vehicle is responding to the current incident when a location of the vehicle indicates that the vehicle is en-route to a location of the current incident.

15. The vehicle computer of claim 12, wherein the information related to the current incident includes at least one of an identifier of the current incident, location of the current incident, type and severity level of the current incident, and user profiles related to the current incident.

16. The vehicle computer of claim 12, wherein the first context parameter is identified based at least on one of an identifier of the current incident, location of the current incident, type and severity level of the current incident, user profiles related to the current incident, operating conditions of the vehicle, location of the vehicle, and information related to a user associated with the vehicle.

17. The vehicle computer of claim 12, wherein the query includes a request to contact another user and further wherein the electronic processor is configured to:
   when the current incident status of the vehicle identifies that the vehicle is responding to the current incident,
      obtain, based on the first context parameter, contact information of a first user profile related to the current incident that matches with the request, and
      configure a radio associated with the vehicle to initiate a communication based on the contact information; and
   when the current incident status of the vehicle identifies that the vehicle is not responding to the current incident,
      obtain, based on the second context parameter, contact information of a second user profile that is not related to the current incident and further matches with the request, and
      configure the radio to initiate a communication based on the contact information of the second user profile.

18. The vehicle computer of claim 12, wherein the query includes a request to join a talk group and further wherein the electronic processor is configured to:
   when the current incident status of the vehicle identifies that the vehicle is responding to the current incident,
      obtain, based on the first context parameter, first talk group information related to the current incident, and
      configure a radio associated with the vehicle to join one or more talk groups of the current incident based on the first talk group information; and
   when the current incident status of the vehicle identifies that the vehicle is not responding to the current incident,
      obtain, based on the second context parameter, second talk group information that is not related to the current incident, and
      configure the radio to join one or more talk groups based on the second talk group information.

19. The vehicle computer of claim 12, wherein the query includes a request for navigation and further wherein the electronic processor is configured to:
   when the current incident status of the vehicle identifies that the vehicle is responding to the current incident,
      obtain, based on the first context parameter, a first location of the current incident, and
      provide, at an output interface of the vehicle computer, information identifying one or more routes to the first location of the current incident; and
   when the current incident status of the vehicle identifies that the vehicle is not responding to the current incident;
      obtain, based on the second context parameter, a second location that is not related to the current incident; and
      provide, at the output interface, information identifying one or more routes to the second location.

20. The vehicle computer of claim 12, wherein the query includes a request to adjust an operating condition of the vehicle and further wherein the electronic processor is configured to:
   when the current incident status of the vehicle identifies that the vehicle is responding to the current incident,
      obtain, based on the first context parameter, a first set of one or more operating parameters for the vehicle that is mapped to the current incident, and
      adjust the operating condition of the vehicle based on the first set of one or more operating parameters; and
   when the current incident status of the vehicle identifies that the vehicle is not responding to the current incident,
      obtain, based on the second context parameter, a second set of one or more operating parameters for the vehicle that is not mapped to the current incident; and
      adjust the operating condition of the vehicle based on the second set of one or more operating parameters.

* * * * *